US008537981B1

(12) United States Patent
Cyriac et al.

(10) Patent No.: US 8,537,981 B1
(45) Date of Patent: Sep. 17, 2013

(54) INTERRUPTING A CONFERENCE CALL FOR AN EMERGENCY SITUATION

(75) Inventors: Shaiju Cyriac, Westminster, CO (US); Diana M. D'Angelo, Broomfield, CO (US); Sreerupa Das, Arvada, CO (US); Bruce W. Hill, Broomfield, CO (US); William C. Leck, Arvada, CO (US)

(73) Assignee: Avaya Inc., Basking Ridge, NJ (US)

( * ) Notice: Subject to any disclaimer, the term of this patent is extended or adjusted under 35 U.S.C. 154(b) by 1254 days.

(21) Appl. No.: 11/514,571

(22) Filed: Aug. 31, 2006

(51) Int. Cl.
*H04M 1/64* (2006.01)
(52) U.S. Cl.
USPC .......................................... 379/88.12; 379/37
(58) Field of Classification Search
USPC .......................................... 379/37–45, 88.12
See application file for complete search history.

(56) References Cited

U.S. PATENT DOCUMENTS

| 6,658,104 | B1 * | 12/2003 | Carrion et al. ........... 379/220.01 |
| 7,123,926 | B2 * | 10/2006 | Himmelstein ............. 455/456.1 |
| 7,522,060 | B1 * | 4/2009 | Tumperi et al. ............ 340/573.4 |
| 2003/0169854 | A1 * | 9/2003 | Yoshitani ........................ 379/37 |
| 2004/0095238 | A1 * | 5/2004 | Beere ............................ 340/531 |
| 2005/0132016 | A1 * | 6/2005 | Boone ........................... 709/207 |

* cited by examiner

*Primary Examiner* — Amal Zenati
(74) *Attorney, Agent, or Firm* — Sheridan Ross P.C.

(57) ABSTRACT

The present invention provides a system and method for providing an announcement to a plurality of communication devices when a subset of those communication devices are currently engaged in a call. More specifically, an announcement may be provided to different communication devices depending upon the location of the communication device.

21 Claims, 5 Drawing Sheets

INTERRUPTING A CONFERENCE CALL FOR AN EMERGENCY SITUATION

FIELD OF THE INVENTION

The present invention is directed generally to telephony networks and specifically to providing an emergency alert to multiple participants of one or many calls.

BACKGROUND OF THE INVENTION

Event notification systems are often deployed in buildings, factories, shops, and other locations to provide announcements and/or warnings to individuals within the premises. Examples of event notification systems include fire alarms, tornado warning systems, earthquake alert systems, amber alert systems, hurricane warning systems, Public Address (PA) systems, and so on. Emergency alert systems are designed to disseminate information to individuals within the premises such that they have a chance to escape or find appropriate shelter or take appropriate action depending upon the nature of the emergency. The use of emergency alert systems is generally required in buildings according to local building codes. Additionally, PA systems are typically employed such that people can receive emergency and/or non-emergency related notifications. For example, in a shopping store, a clerk may request assistance at the front counter by transmitting an announcement over the PA system.

PA systems and other conventional event notification systems generally provide their announcements over strategically placed sound transmitters, for example, speakers, bells, and the like. At least one transmitter is usually located in each room of a building such that individuals in that room will receive the announcement when it is transmitted over the event notification system. The effectiveness of these event notification systems relies greatly upon whether the individuals are in a room equipped with PA speakers or bells. Additionally, the event notification system can only be effective if the individual hears the announcement.

There may be many circumstances in which an individual may be resident in a room with a PA speaker but may still fail to receive the announcement. For example, if the individual in conversing with another person over a communication device such as a phone, the individual may not necessarily hear the announcement. This is especially likely if the individuals are in a crowded and noisy conference room.

If the individual is using headphones or the like to talk on the communication device, then the probability that the individual will not receive the announcement also greatly increases. Also individuals may be sitting in a closed-door conference room from where they are not able to hear the announcement. Additionally, mechanical and/or electrical failures in the wiring of the PA system or in the PA system itself may lead to the announcement being transmitted by only a subset of all PA speakers. In this circumstance, those individuals in rooms with malfunctioning speakers will likely not receive the announcement. The failure to receive announcements can make it difficult if not impossible for individuals to react properly to the announcement. Moreover, the failure to receive an announcement related to an emergency situation may gravely impact the safety of individuals within the premises.

There have been some attempts to address these issues. As an example, television, radio, and other broadcasts are communications that can be interrupted such that an emergency notification can be transmitted. However, these types of interruptions are generally limited to one-way communications and generally cannot be applied to the bidirectional communication technology used in phones and the like.

Other solutions that do apply to bidirectional communications generally only allow one party to be interrupted on a per call basis. Transmitting event notifications to many communication devices in a short time is usually not feasible if it has to be done so one communication device at a time.

Additionally, reverse 911 solutions can provide alert notifications for persons that may be impacted by potentially hazardous or serious situations. However, this alternative leaves something to be desired because it generally only calls a subscriber database and typically does not interrupt an active phone call. Some examples can be found, for example, in U.S. Patent Application No. 2005/0083911 to Grabelsky et al. Grabelsky describes a system that provides emergency services the location of various communication devices based on the identifiers of the communication device (e.g., extension, ELIN, switch/port identifier, and/or MAC address).

SUMMARY

These and other needs are addressed by various embodiments and configurations of the present invention. The present invention is directed generally to an emergency notification system. More specifically, multiple participants of one or a plurality of calls may be notified of the emergency or similar type of situation directly over the phone rather than relying upon conventional PA systems.

In accordance with one embodiment of the present invention, a method for providing an emergency notification is provided. The method generally comprises the steps of:

(a) identifying a location of an event (that typically would result in an alert);

(b) identifying a first and a second recipient for an event notification based upon a location of the first and second recipients and the location of the event;

(c) determining that the first and second recipients are participating in a call;

(d) preparing a first event notification for the first recipient and a second event notification for the second recipient;

(e) interrupting a connection between the first and second recipient and their call; and (f) providing the first event notification to the first recipient and the second event notification to the second recipient.

As used herein, a "call" can include any type of real-time interactive communication including, without limitation, voice and/or video calls, cellular calls, Voice over Internet Protocol (VoIP) calls, and the like.

By interrupting a connection of the first and second recipient, several advantages can be realized. For example, there is a greater probability that the intended recipients of the message will receive the message because a communication medium that is currently in use by the intended recipient is the same medium used to provide the notification. This makes it much more difficult for the recipient to ignore or miss the notification. Moreover, recipients can now be provided with an event notification without relying upon standard PA technology where speakers and the like have fixed locations. Rather, the notification can be sent to communication devices that are usually within a close proximity to the intended recipient. Furthermore, these advantages can be realized without an undue burden of wiring a whole new PA system.

In one embodiment of the present invention, when a call is interrupted not all of the participants of the call may receive the emergency notification. Often times, a call or even a conference call is held between parties at great distances. Accordingly, an event notification that applies to the location of a first recipient may not equally be applied to the second recipient. For this reason, different event notifications can be sent to each party of the call. Those recipients whom may be impacted by the event may receive an event alert notifying them of the alert and what steps should be taken (e.g., a fire drill with evacuation instructions). However, those participants who may not be impacted by the event, maybe because they are on a different floor or in a different building, may not need to receive an event alert. Instead, these participants may receive a different message telling them that the other participants (those who may be impacted by the event) are receiving an event alert and they may be required to leave the call. This message is transmitted so that the participants who are not being impacted by the event can know why the other participants are not responding to the conversation.

In accordance with one embodiment of the present invention, the recipients of the event notification(s) do not need to be participating in the same call. The event notification(s) may be transmitted to multiple recipients on multiple calls with the placement of a single call to a common switch. However, each of the calls may not necessarily be using the same switch.

In accordance with another embodiment of the present invention, event notifications can be sent to participants based on their location. The location of participants can be determined prior to generating and transmitting an event notification. In one embodiment, the event notification can be transmitted to one or a number of switches associated with a location of interest and all communication devices connected to or associated with that switch can be recipients of the event notification. This way event notifications can be sent to different locations using a number of different techniques.

These and other advantages will be apparent from the disclosure of the invention(s) contained herein. The above-described embodiments and configurations are neither complete nor exhaustive. As will be appreciated, other embodiments of the invention are possible utilizing, alone or in combination, one or more of the features set forth above or described in detail below.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

DETAILED DESCRIPTION

The invention will be illustrated below in conjunction with an exemplary communication system. Although well suited for use with, e.g., a system using switches and/or servers, the invention is not limited to use with any particular type of communication system or configuration of system elements. Those skilled in the art will recognize that the disclosed techniques may be used in any communication application in which it is desirable to interrupt a call, conference call, or multiple calls such that an event notification can be transmitted to participants of that call.

Figure 1A:
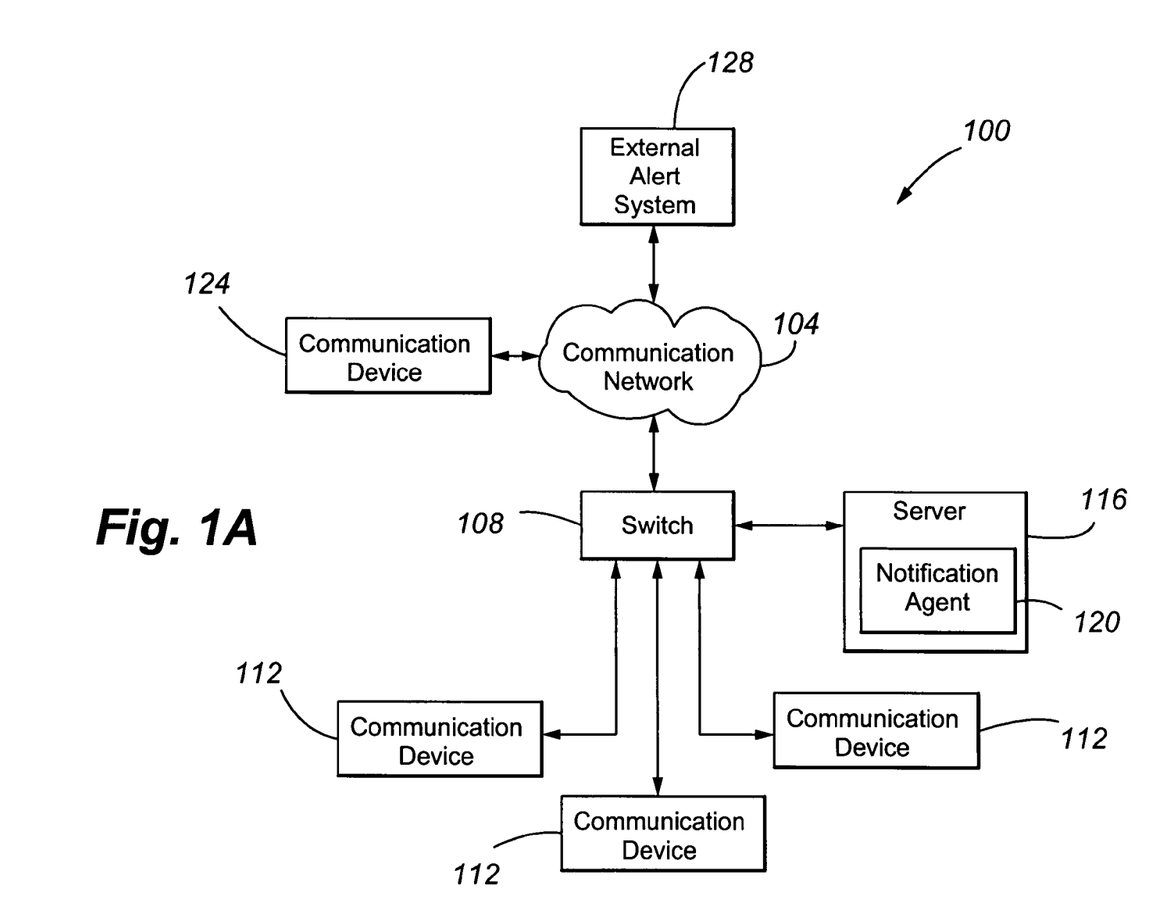
FIG. 1A is a block diagram depicting a communication system in accordance with embodiments of the present invention.

FIG. 1A shows a communication system 100 in accordance with at least one embodiment of the present invention. The communication system 100 generally comprises a communication network 104 for connecting communication devices 112 and 124. The communication network 104 generally employs some type of communication switch 108 to connect endpoints such as communication devices 112, 124 to one another.

The switch 108 and communication devices 112 are generally associated with an enterprise premises (i.e., customer premises). In one embodiment, the switch 108 may include a private branch exchange (PBX) system or any similar type of switching system capable of providing a telephone service to the enterprise. The switch 108 may be one of a number of known exchange systems including, but not limited to, Private Automated Branch Exchange (PABX), Computerized Branch Exchange (CBX), Digital Branch Exchange (DBX), Integrated Branch Exchange (IBX), or a networked device with switches.

The communication network 104 may comprise any type of information transportation medium and may use any type of protocols to transport messages between endpoints. The communication network 104 may include wired and/or wireless communication technologies. Examples of the communication network 104 include, without limitation, a standard Plain Old Telephone System (POTS), an Integrated Services Digital Network (ISDN), a Public Switched Telephone Network (PSTN), a Local Area Network (LAN), a Wide Area Network (WAN) like the Internet, and any other type of packet-switched or circuit-switched network known in the art.

The switch 108 also provides a connection for the communication devices 112 to the communication network 104 such that they can communicate with the external communication device 124. The external communication device 124 may be connected to the communication network 104 through a separate switch associated with a separate enterprise. Alternatively, the external communication device 124 may be connected directly to the communication network 104 without the use of a switch 108.

The communication devices 112, 124 may be packet-switched or circuit-switched and can include, for example, IP hardphones such as the Avaya Inc.'s, 4600 Series IP Phones™, IP softphones such as Avaya Inc.'s, IP Softphone™, Personal Digital Assistants or PDAs, Personal Computers or PCs, laptops, packet-based H.320 video phones and conferencing units, packet-based voice messaging and response units, packet-based traditional computer telephony adjuncts, and conventional wired or wireless telephones.

A server 116 is an example of an enterprise server and may be connected to the switch 108. The server 116 may include a notification agent 120 that is operable to interrupt various calls that are being serviced by the switch 108 and provide the communication devices 112, 124 connected thereto an event notification. The notification agent 120 is generally a set of computer readable instructions stored in a memory of the server 116 that can be executed by a processor of the server 116. The notification agent 120 may be implemented on the server 116 as software, firmware, hardware, or combinations thereof.

In one embodiment, as can be appreciated by one skilled in the art, the notification agent 120 does not necessarily need to be implemented on a dedicated server 116. Rather, the functionality of the notification agent 120 may be implemented, wholly or in part, in the switch 108 and/or a communication device 112, 124. In one embodiment, the notification agent 120 may be resident on a communication device 112, 124 attempting to send an event notification to other communication devices.

In accordance with at least one embodiment, the notification agent 120 is capable of identifying the location of an event and comparing that location to locations of each communication devices 112, 124 being serviced by the switch 108. Based on the relative location of the event to the communication device 112, 124, the notification agent 120 can identify those communication devices 112, 124 that should be recipients of an event notification. Some of the communication devices 112, 124 may be relatively close to the event such that users of the communication devices 112, 124 will likely be impacted by the event. These communication devices 112, 124 should receive an event alert through the switch 108. Alternatively, the notification agent 120 can provide a second different message to communication devices 112, 124 that will likely not be impacted by the event. The second different message may include an explanation that other participants of the call are receiving an event alert and are unable to respond to comments made by participants that are likely not impacted by the event.

In one embodiment, the communication devices 112, 124 depicted may be participating in a conference call and the switch 108 may be providing a conference bridge between all communication devices 112, 124. The notification agent 120, in one embodiment, is operable to interrupt the conference call, provide a subset of the participants a first message and provide another subset of the participants a second different message. In an alternative embodiment, the notification agent 120 may interrupt the conference by connecting to the conference and broadcasting a single event notification to all participants of the conference. This particular embodiment is advantageously suited to instances where all conference participants are likely to be impacted by the event (e.g., participants are in the same building for which a tornado warning has been issued).

As can be appreciated by one of skill in the art, the server 116 may not necessarily be connected directly to the switch 108. Instead, the server 116 may be connected to the communication network 104 and communicates with the switch 108 and communication device 124 via the communication network 104.

The communication system 100 may further include an external alert system 128. The external alert system 128 may be commonly associated with the enterprise of the switch 108, although such an association is not required. Examples of an external alert system 128 associated with the enterprise of the switch 108 may include a fire alarm, smoke alarm, heat alarm, or carbon monoxide alarm for a building serviced by switch 108. One example of an external alert system 128 that is disassociated with the enterprise of the switch 108 might be a Weather Alert System (e.g., the National Weather Service administered by the National Oceanic and Atmospheric Administration (NOAA)).

Alerts issued by the external alert system 128 may be received by the notification agent 120 and analyzed to determine if any communication devices 112, 124 should receive an event notification. The notification agent 120 may filter alerts according to the location of the event and context (e.g., interrupting a business call for an Amber alert may not be necessary) related to the alert issued by the external alert system 128. Additionally, the notification agent 120 may filter alerts according to the severity, urgency, and/or type of alert. For example, if the alert issued by the external alert system 128 related to a high wind advisory, then the notification agent 120 may determine that no calls should be interrupted because such an event does not meet a particular risk threshold. However, if the alert issued by the external alert system 128 is for a tornado, hurricane, tsunami, or the like having a higher risk that meets the risk threshold, then the notification agent 120 may further analyze the alert to determine the location of the event and compare that location to locations of the communication devices 112, 124. Then if any users of communication devices 112, 124 will likely be impacted by the event the notification agent 120 interrupts the calls of those communication devices 112, 124 and provides the necessary event notification. Those participants of calls who are not impacted by the event but have lost a connection with other participants may receive a different event notification. In one embodiment, the notification agent 120 is operable to interrupt multiple calls and/or multiple conferences using a single call placed to the switch 108.

The term "switch" or "server" as used herein should be understood to include a PBX, an ACD, an enterprise switch, an enterprise server, or other type of telecommunications system switch or server, as well as other types of processor-based communication control devices such as media servers, computers, adjuncts, etc.

Figure 1B:
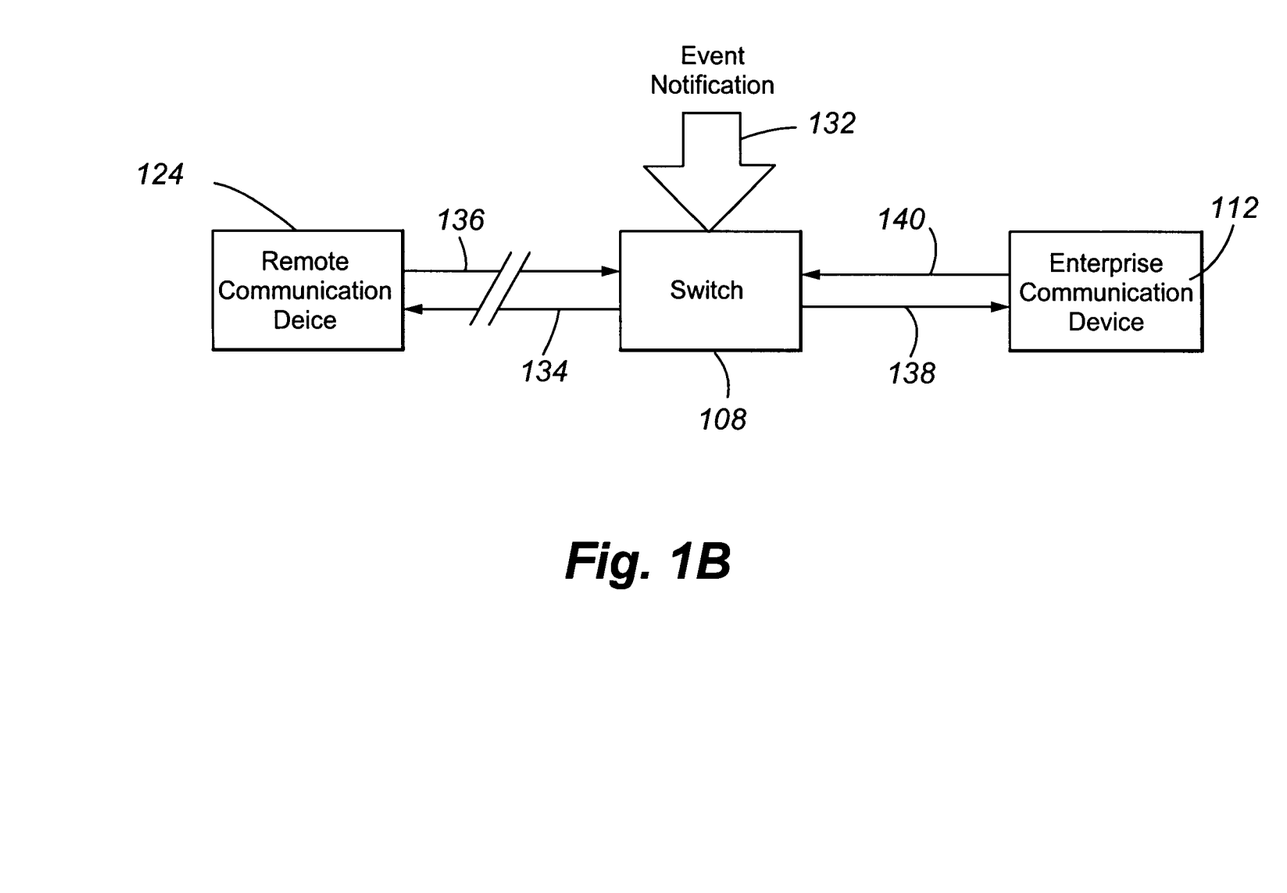
FIG. 1B is a block diagram depicting a switch and communication devices in accordance with embodiments of the present invention.

FIG. 1B depicts an exemplary switch 108 capable of distributing an event notification 132 to various communication devices 112, 124. When an event notification 132 is received at the switch 108, a number of options are available to the switch 108 when distributing an event notification 132. The switch 108 is able to communicate bi-directionally with the enterprise communication device using communication lines 138 and 140. Likewise the switch 108 can communicate with the remote communication device 124 using communication lines 134 and 136. Upon receipt of an event notification 132, the switch 108 can provide each communication device 112, 124 the event notification. In one embodiment, the event notification provided to each communication device 112, 124 is substantially the same. When a similar event notification 132 is sent to each communication device 112, 124 the event notification 132 may include data relating to the location of the event. This way users of the communication devices 112, 124 can determine if the event will likely impact them. For example, if the event relates to a fire alarm for a building associated with the enterprise communication device 112, then the event notification 132 may include location information telling both participants that a fire alarm is being sounded for the building associated with the enterprise communication device 112. This allows the user of the enterprise communication device 112 to react to the fire and further allows the user of the remote communication device 124 to know why the other user may have to leave.

Another option available to the switch 108 is to selectively provide the event notification 132 to one or both of the communication devices 112, 124. In this option the switch 108 may determine what communication device 112, 124 will likely be impacted by the event based upon the known location of the event and communication device 112, 124. Then the switch 108 can provide the event notification 132 only to those communication devices 112, 124 that will likely be impacted by the event.

A further option available to the switch 108 is to send different messages to each communication device 112, 124. For example, the event notification 132 received at the switch 108 may include a first message and a second message. The first message may apply to those parties that may be affected by the event and the second message may apply to parties that will likely not be affected by the event. In this embodiment, the switch 108 provides a first event notification having the first message to the enterprise communication device 112 via communication line 138. At substantially the same time the switch 108 provides a second event notification having the second message to the remote communication device 124 via communication line 134. By providing the switch 108 with options for distributing event notifications 132, users of the communication devices 112, 124 can be made aware of events with a greater accuracy based on their location.

Figure 2:
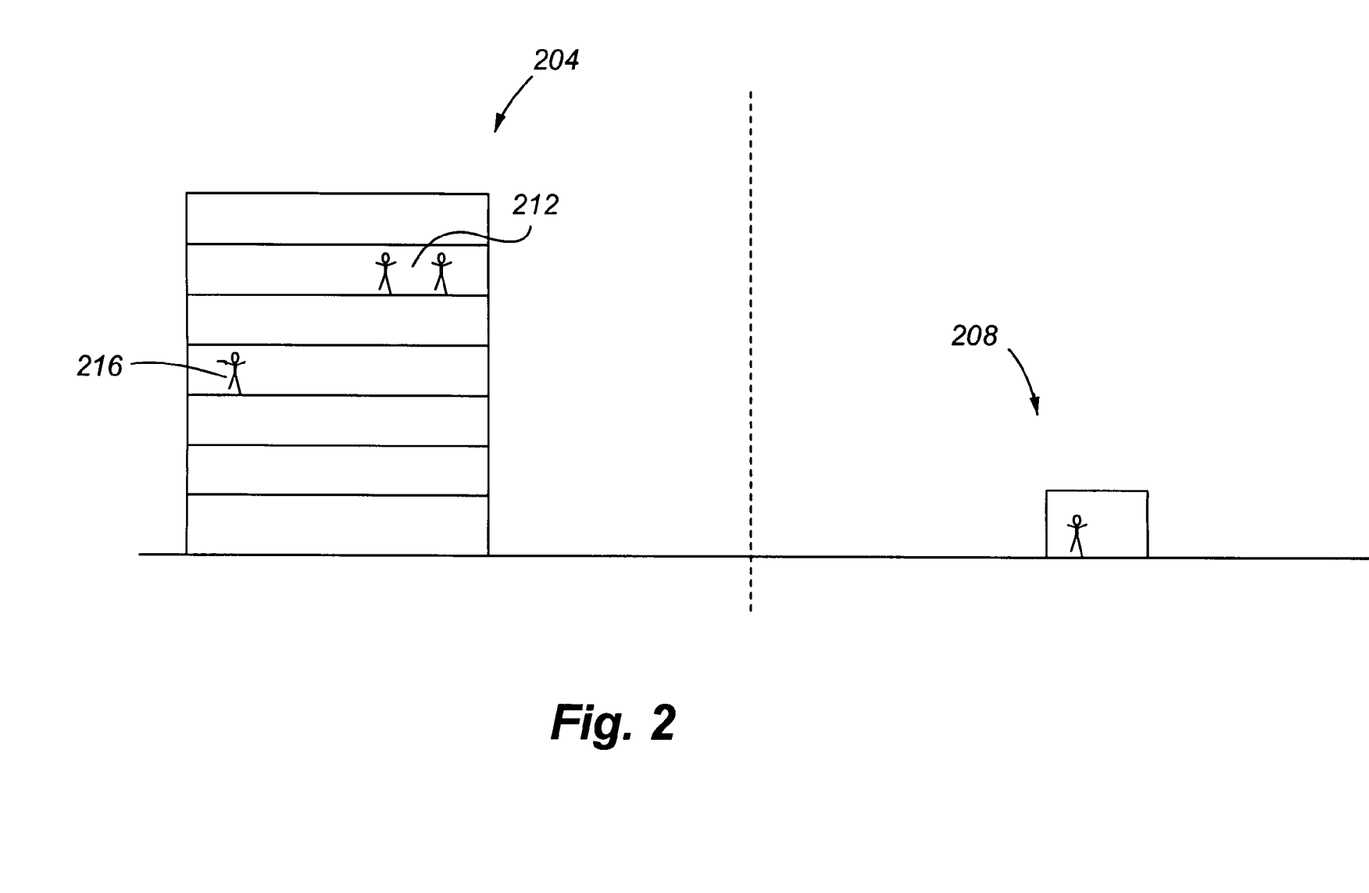
FIG. 2 is a diagram depicting locations of various call participants in accordance with embodiments of the present invention.

Referring now to FIG. 2, further functionality of the notification agent 120 will be described in accordance with at least some embodiments of the present invention. The notification agent 120 is generally capable of identifying the location of various participants of calls by analyzing the communication device 112, 124 used by the participants. Often when a communication device 112, 124 is registered with a switch 108 or integrated into an enterprise communication system, the location of the communication device 112, 124 is provided to the switch 108 and/or server 116. There are many known techniques for identifying the location of communication devices 112, 124 based on various data provided by the communication devices 112, 124. Most location techniques are implemented as a part of emergency service (i.e., 911 call) requirements. The switch 108 and/or server 116 generally comprise the required information that can be useful in identifying users based on the location of their communication device 112, 124. The location of a communication device 112, 124 may be determined to various degrees of accuracy. For example, the location of a communication device 112, 124 may be determined within several miles by area code down to a room in a building by switch 108 and/or port identifiers.

In the exemplary non-limiting diagram of FIG. 2, one set of participants resides in a first general location 204 and another participant resides in a second general location 208. The participants residing in the first general location 204 (e.g., a building) are further separated within the first general location 204. Specifically, two of the participants reside on the sixth floor of the building 212 and another participant resides on the fourth floor of the building 216. Accordingly, the locations of the participants are generally the same (i.e., they are in the same building), but are specifically different (i.e., they are on different floors). In other embodiments, some participants may be considered to be in different specific location even though they are on the same floor of a building.

The notification agent 120 can determine the locations of each of these participants and provide event notifications to each participant based on their location and the location of the event. For example, the event may be related to smoke detected on the sixth floor. The participants on the sixth floor 212 may receive an event notification telling them that smoke has been detected on their floor and they should evacuate. The participant residing on the fourth floor 216 may receive an event notification telling him/her that smoke has been detected in the building and they should standby for further instructions. The participant residing in the second general location 208 may receive a third different event notification telling him/her that all other participants are currently receiving event alerts and they therefore cannot reply.

In another example, the event may impact the second general location 208 and not the first general location 204. In this event, the participant residing in the second general location 208 may have their call interrupted such that an event notification can be provided to them. When the participant at the second general location 208 is interrupted, the other participants at the first general location 204 may receive a different event notification informing them that the other participant cannot current contribute to the conference call.

Figure 3:
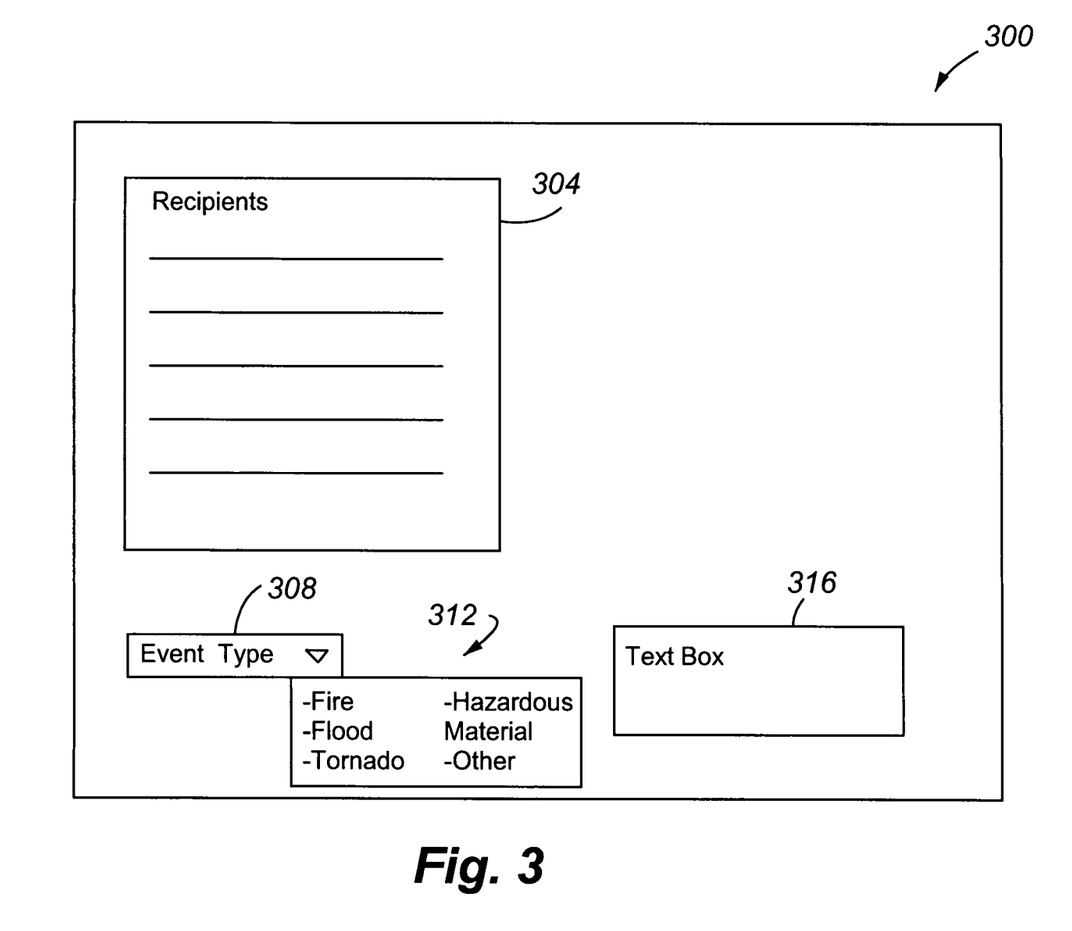
FIG. 3 is a block diagram depicting an event notification user interface in accordance with embodiments of the present invention.

Referring now to FIG. 3 a user interface 300 used in conjunction with the notification agent 120 will be described in accordance with at least some embodiments of the present invention. A user may access the notification agent 120 through the user interface 300, which typically resides on the server 116. Thus, the notification agent 120 can generate event notifications manually and/or automatically. The user interface 300 generally comprises a recipients field 304. The recipients field 304 can be populated manually by a user of the notification agent 120. Alternatively, the notification agent 120 may automatically populate the recipients field 304 based upon the location of the event, type of event (e.g., an amber alert does not need to be broadcast in an office environment), risk associated with the event, and the location of the communication devices 112, 124. The recipient's field 304 may be filled out according to user and/or communication device 112, 124 identifiers.

The user interface 300 may also include an event type selector 308. The event type selector 308 can be employed by a user to select the type and/or risk level of the event. The event type selector 308 may include a list of potential events 312 that would require an event notification. By selecting an event from the list of event 312, a "canned" or prerecorded message or video may be included as a part of the event notification. This way a new message does not need to be generated every time a common event notification, such as a fire alarm, goes off. Rather, the fire event can be selected from the list of events 312 and the prerecorded fire message may be included along with location specific information as a part of the event notification. The notification agent 120 may also be capable of automatically selecting an event from the list of event 312 based on the reception of an event alert from the external alert system 128.

In the event that a prerecorded message is not desirable for the event notification, the user interface 300 may further include a text box 316. A message may be inserted into the text box 316 and a text-to-speech converter can transform the text into an audible message that can be transmitted as a part of the event notification. In an alternative embodiment, the text from the text box 316 can be included as a part of the event notification in text form. As can be appreciated, event notification can be provided in many different forms to communication devices 112, 124 having different features. Specifically, U.S. Pat. No. 6,658,104, the entire disclosure of which is hereby incorporated herein by this reference, describes various methods of providing an event notification to a communication device regardless of whether the communication device is in use or not.

Figure 4:
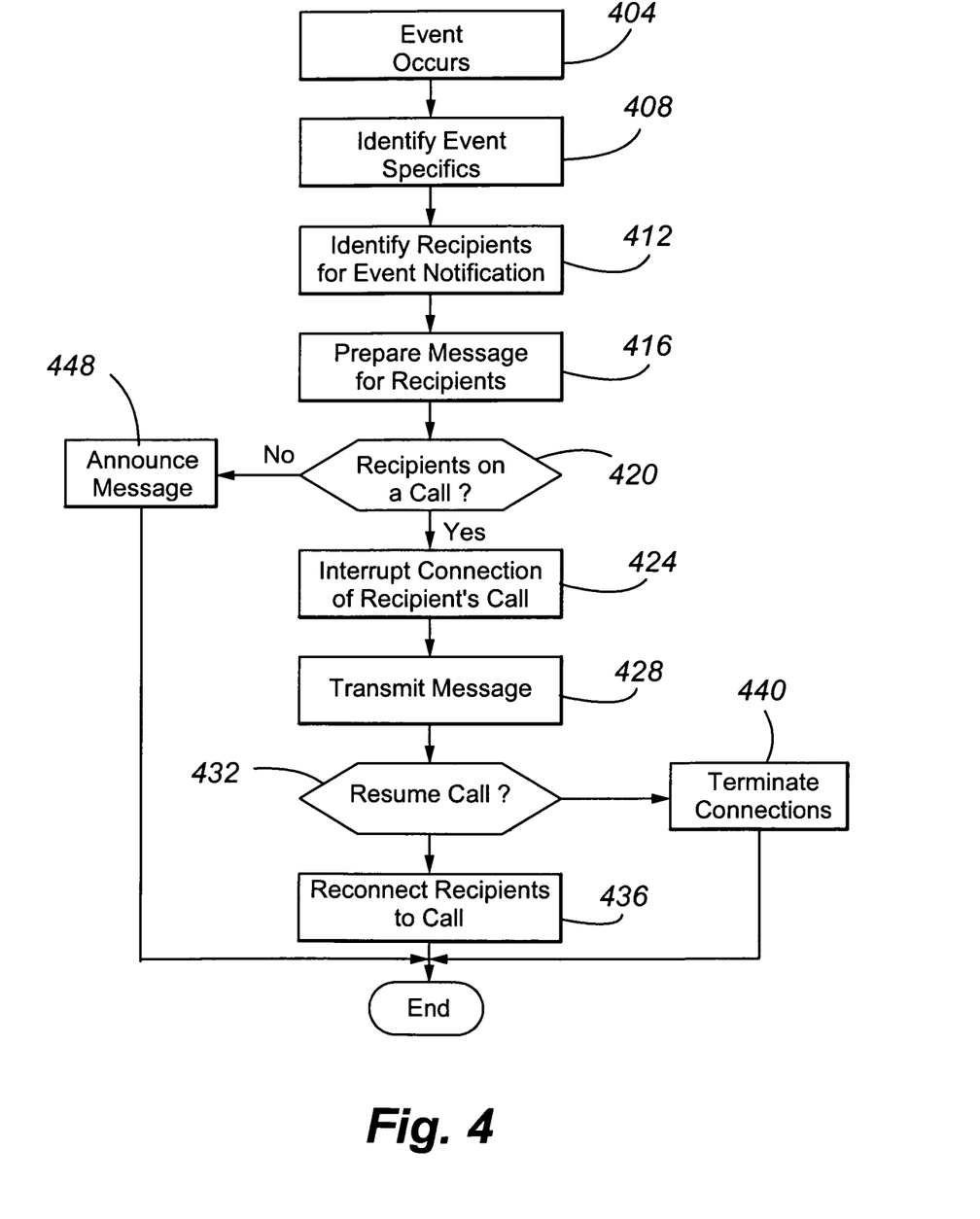
FIG. 4 is a flow diagram depicting a method of issuing an event notification in accordance with embodiments of the present invention.

FIG. 4 depicts a method of providing an event notification to various participants of one or more calls in accordance with at least some embodiments of the present invention. Initially, the method begins when an event occurs (step 404). Thereafter, event specifics are determined manually and/or automatically (step 408). Event specifics may include the risk level associated with the event, urgency associated with the event, the type of the event, location of the event and so on.

Once event specifics have been determined, then the recipients for the event notification are identified (step 412). The notification agent 120 may identify recipients by comparing the location of communication devices 112, 124 to the location and risk/urgency level of the event. The notification agent 120 may alternatively identify recipients based upon the switch 108 that they are using. Alternatively, a user may manually input recipients for a particular event notification. In a further embodiment, addresses associated with the communication devices 112, 124 are mapped against the location of the event or at least possible locations that might be affected by the event. User locations may be determined using location information stored in databases upon registration of the communication device 112, 124 with the switch 108. Storing and using such location information is described in further detail in U.S. patent application Ser. No. 10/795,119, to Moon et al., the entire disclosure of which is hereby incorporated herein by this reference. Location information may be determined and used based on one or more of an extension, a MAC address, an IP address, an ELIN, a switch identifier, and a port identifier of the communication device 112, 124.

With the recipients of the event notification identified, the notification agent 120 and/or user of the notification agent prepares the message for the recipients (step 416). At this step, one or more of a canned message, a text message, a text-to-speech message, a video message, a recorded message, and/or a live voice/video message may be included as part of the event notification. Moreover, different event notifications may comprise different messages. For example, a first recipient may receive a first event notification whereas a second recipient may receive a second different event notification.

After the recipients have been identified and the event notifications and their corresponding messages have been prepared, then it is determined if the recipients are actively participating in a call (step 420). If a recipient is actively participating in a call, then the notification agent 120 interrupts the connection of the recipient's call (step 424). The notification agent 120 may interrupt the call by breaking the connection between the switch and the recipient's communication device 112, 124. Alternatively, the notification agent 120 may register with the switch 108 and become an additional participant in the call.

Another type of interruption may include sending a tone, beep, or the like to the recipient indicating that another call is waiting. With this type of interruption, the recipient will switch lines before an event notification is provided to him/her.

After the notification agent 120 has successfully interrupted the call, then the event notification and the corresponding message therein can be transmitted to the recipient (step 428). As noted above, the event notification can be transmitted using a number of different media including, but not limited to, voice, text, video, and combinations thereof. The risk and/or urgency associated with the event may further dictate how the event notification is transmitted. For example, the event notification may be transmitted in text form if it is a non-urgent event such as an announcement that bagels are available in the kitchen. However, for more urgent events such as those that might endanger recipients, a more noticeable event notification such as a voice message may be used as a part of the event notification. During the transmission step, the event notification(s) can be sent to the switch 108 such that they are received by the recipients at substantially the same time. The notification agent 120 may further be operable to transmit different event notifications at substantially the same time to a number of switches 108. In accordance with at least one embodiment of the present invention, the notification agent 120 is operable to interrupt multiple calls and provide multiple event notifications to a number of recipients using a single call placed to the switch 108.

Once the event notification has been successfully transmitted, it is determined if the call that has been interrupted should be resumed (step 432). This determination may again be based upon the risk and/or urgency associated with the event. In the event that the call is to be resumed (e.g., the event neither poses a serious risk nor does is demand an urgent response), the recipients may be reconnected to the call (step 436). This way the call can continue, or at a minimum the recipients that may be impacted by the event can quickly talk to the other participants to tell them they will call back later. Instances in which the event is relatively urgent and/or poses a significant risk to the recipient of the event notification, the call may not be resumed and the connections of those recipients that may be impacted by the event are terminated (step 440). However, those participants that may not be impacted by the event may still be allowed to continue the call until the call is finished. Once the call is finished, either due to the automatic termination of the call or due to the natural end of the call, the method ends (step 444).

Reverting back to step 420, in the event that one or more recipients are not currently participating in a call, the event notification may be announced over the communication device 112, 124 (step 448). By providing the event notification over the communication device 112, 124, further points of announcement can be realized in addition to previously wired PA speakers and the like. Once the notification agent 120 has transmitted the event notification, the method ends at step 444.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
a processor executing a notification agent;
the notification agent receiving event information associated with an event, wherein the event justifies an alert;
the notification agent automatically determining event specifics from the received event information, wherein the step of determining the event specifics comprises:
the notification agent identifying a location of the event;
the notification agent determining an event type associated with the event;
the notification agent determining a risk level and urgency associated with the event based on the event type and the location of the event;
the notification agent identifying at least a first and a second recipient for an event notification based upon a location of the first and second recipients and the location of the event;
the notification agent determining that the first and second recipients are participating in a common call;
the notification agent preparing a first voice event notification for the first recipient and a second voice event notification for the second recipient;
the notification agent interrupting a voice connection between the first and second recipients and their call; and
the notification agent providing the first voice event notification to the first recipient and the second voice event notification to the second recipient, wherein the manner in which the event notifications are provided to the recipients depends, at least in part, upon the risk level and urgency associated with the event, wherein the first voice event notification provided to the first recipient is different than the second voice event notification provided to the second recipient, and wherein the first voice event notification and the second voice event notification are provided using the same communication medium as the voice connection between the first and second recipients.

2. The method of claim 1, wherein the first and second participants are participating in the common call using the same communication device.

3. The method of claim 2, wherein the first recipient is located within proximity of the event location and the second recipient has a location disassociated with the event location.

4. The method of claim 3, wherein the first voice event notification comprises an alert related to the event and wherein the second event notification comprises a message informing the second recipient that the first recipient is being alerted about the event.

5. The method of claim 2, wherein the first and second recipients have a similar location within proximity of the event.

6. The method of claim 5, wherein the first and second event notification are substantially the same.

7. The method of claim 5, wherein third and fourth participants are participating in the common call with the first and second recipients, and wherein interrupting comprises breaking the voice connection, the method further comprising:
maintaining the connection between the third and fourth participants while the first and second recipients have their connections interrupted; and
after the first and second recipients have received the first and second event notifications respectively, automatically reconnecting the first and second recipients to the common call.

8. The method of claim 1, wherein the first and second participants are participating in the common call with different communication devices.

9. The method of claim 1, further comprising:
selecting from a set of prerecorded messages a message that relates to the event type and reflects the determined at least one of a risk level and urgency associated with the event; and
including the message in at least one of the first and second event notifications.

10. The method of claim 1, wherein the first and second event notifications comprise at least one of a canned message, a text-to-speech message, and a live message.

11. The method of claim 1, further comprising:
receiving a message related to an event from an external event alert system; and
including the message related to the event in at least one of the first and second event notifications.

12. A non-transitory computer readable medium comprising executable instructions for performing the steps of claim 1.

13. A telephony exchange system, comprising:
a switch connecting at least a first and a second communication device; and
a server comprising:
a memory;
a processor in communication with the memory, the processor operable to execute an event notification agent, the event notification agent operable to:
receive, from a user, one or more voice event notifications to associate with an event type, wherein each voice event notification is associated with a risk level and urgency;
receive an event with associated event information, wherein the event information includes the event type and the risk level and urgency;
based on the event information, determine at least one voice event notification received from the user to provide to at least one recipient;
identify the first and second communication devices as recipients for an event voice notification based upon a location of the first and second communication devices relative to a location of an event;
prepare the identified event voice notification for the first and second communication devices;
interrupt the connection between the first and second communication devices and the switch, wherein the connection is a voice connection; and
provide the identified event voice notification to the first and second communication devices at substantially the same time, wherein a manner in which the event voice notifications are provided to the recipients depends, at least in part, upon a risk level and urgency associated with the event, wherein the first and second communication devices are associated with different locations and wherein the event voice notifications comprise first and second voice messages that are different because a risk level associated with the event is different for the first recipient as compared to the second recipient, and wherein the first and second voice messages are delivered using the first and second communication devices.

14. The method of claim 1, further comprising:
the notification agent determining whether the common call should be resumed based on the risk level and urgency associated with the event; and
in response to determining that the common call should be resumed, reconnecting the first and second recipients.

15. The system of claim 13, further comprising receiving a signal from the agent to disconnect out of the coupled calls once the calling party and the called party are speaking by way of the coupled calls.

16. The system of claim 13, wherein the switch further connects a third and a fourth communication device to the first and second communication devices prior to the interruption, and wherein during the interruption the third and fourth communication devices are still connected.

17. The system of claim 13, wherein the switch, first communication device, and second communication device are associated with a common enterprise.

18. The system of claim 13, wherein the switch and the first communication device are associated with a first enterprise and wherein the second communication device is associated with a second different enterprise.

19. The system of claim 13, further comprising an external event alert system, wherein the event notification agent is operable to receive a message related to an event from the external event alert system, determine that a type of the event meets a predetermined type of event that justifies the voice event notification, and include the message related to the event in the voice event notification.

20. The system of claim 13, wherein the event notification agent is operable to select a message from a set of prerecorded messages and prepare the voice event notification such that the voice event notification comprises the selected message.

21. The system of claim 13, wherein the voice event notification comprises at least one of an emergency event notification and a public announcement.

* * * * *